May 15, 1945. W. KILCHENMANN 2,375,852
REVERSIBLE SUPERCHARGED TWO-STROKE INTERNAL-COMBUSTION ENGINE
Filed Feb. 17, 1942
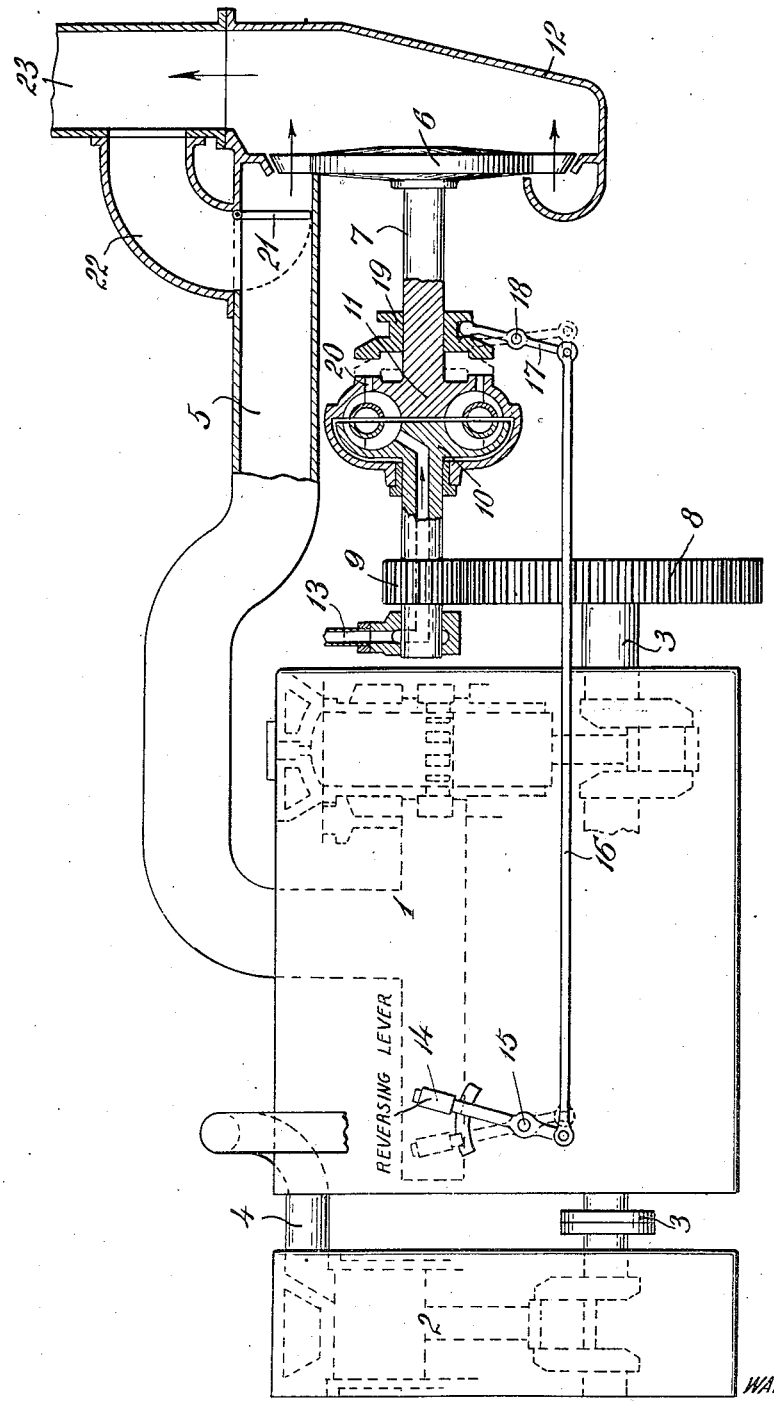
INVENTOR
WALTER KILCHENMANN
BY
ATTORNEYS Patented May 15, 1945

2,375,852

UNITED STATES PATENT OFFICE 2,375,852

REVERSIBLE SUPERCHARGED TWO-STROKE INTERNAL-COMBUSTION ENGINE

Walter Kilchenmann, Winterthur, Switzerland, assignor to Sulzer Frères, Société Anonyme, Winterthur, Switzerland Application February 17, 1942, Serial No. 431,232
In Switzerland May 17, 1941

2 Claims. (Cl. 60—13)

The invention relates to a reversible supercharged two-stroke internal combustion engine and is characterised by the adoption of a volumetric supercharging compressor, an exhaust gas turbine detachably connected to the two-stroke engine through a gear, and elements which prevent the turbine racing when the engine is reversed. The coupling means may be detached when the engine is reversed, and the exhaust gases led, during the reversing process and when running astern, through a bypass into the exhaust gas pipe or to atmosphere. On the turbine shaft a braking device can be provided which acts on the turbine runner during the reversing process and when the engine is running astern, either holding the runner at rest or exercising a sufficiently large braking moment on it. As brake an hydraulic coupling may be adopted which is designed so that it can in no case empty completely. In addition to that, a reversing flap valve can be adopted which closes the bypass pipe when going ahead and the inlet to the exhaust gas turbine when going astern. This reversing valve can be designed in such a way that the bypass pipe is closed when going ahead, and the outlet of the gases from the turbine casing is closed when going astern. The cross-section of the bypass pipe may be approximately equal to the total inlet cross-section of the exhaust gas turbine.

One example of execution of the subject matter of the invention is shown diagrammatically in the drawing.

The two-stroke engine 1 receives scavenging and charging air from a reciprocating pump 2 or rotary blower as air compressor, which is driven by the shaft 3. The air pipe 4 leads air from the reciprocating pump 2 to the two-stroke engine 1. The exhaust pipe 5 leads to the exhaust gas turbine 6 with its casing 12, the shaft 7 of the turbine being connected to the crankshaft 3 through a gear 9, 8. Between the exhaust gas turbine 6 and the gear 9 a Föttinger coupling 10, 11 is arranged. The Föttinger coupling 10, 11 is designed in such a way that it cannot completely empty when oil is allowed to flow away from it, the oil being supplied for instance to the coupling half 10 through pipe 13. Reversing of the engine is effected by a lever 14, which is pivoted at 15 and which makes suitable connections to any of the devices now in use for controlling the fuel and air to reverse the engine (not shown). Lever 14 also connects through a rod 16 to a lever 17, which is pivoted at 18. The oil pipe 20 is opened by the device 19. When the engine is running in reverse, the lever 14 is in the position shown in full lines and the passage 20 is open as shown. When the lever 14 is in the position shown by the broken lines the engine is running ahead and the passage 20 is closed by device 19.

The coupling 10, 11 may be detached when the engine 1 is reversed, so that the exhaust gases are led through a bypass 22 into the exhaust gas pipe 23 or to atmosphere, during the reversing process or also while the engine is running astern. The bypass 22 may be closed by a member 21 (reversing flap) whereby the exhaust gases flow into the exhaust gas pipe 23 or to atmosphere through the bypass 22 when the machine is running astern, and direct into the turbine when the engine is running ahead.

When fuel is shut off or when the reversing mechanism (lever 14) is operated, oil is led away from the coupling 10, 11. When the engine 1 is started to run astern, racing of the turbine is prevented by constructing the Föttinger coupling 10, 11 in such a way that it can never empty completely when oil is led away from it. The turbine 6 will then turn in the contrary sense to the engine 1 and will in addition act as a brake on the engine. On the other hand, however, the turbine is prevented from racing. The engine 1 can no longer give its full output, since the additional output contributed by the turbine 6 is lacking, the turbine in fact now acting as a brake. Nevertheless half the output of the engine is in most cases quite sufficient for running astern.

I claim:

1. The combination with a reversible supercharged two-stroke internal combustion engine which comprises a compressor driven by the engine for supplying the engine with supercharged air, an exhaust gas turbine, a conduit for passing exhaust gas from the engine into the exhaust gas turbine, an hydraulic coupling connecting the shaft of the exhaust gas turbine to the shaft of the engine, and means for removing a part of the oil from the coupling leaving a part of the oil in the coupling, whereby, when the engine is running in reverse, the exhaust gas being delivered to the turbine during reverse operation of the engine, whereby the turbine continues to run in its same direction but is opposed by the braking action of the coupling which is partly filled with oil.

2. The combination with a reversible supercharged two-stroke internal combustion engine which comprises a compressor driven by the engine for supplying the engine with supercharged air, an exhaust gas turbine, a conduit for passing exhaust gas from the engine into the exhaust gas turbine, an hydraulic coupling connecting the shaft of the exhaust gas turbine to the shaft of the engine, means for removing a part of the oil from the coupling leaving a part of the oil in the coupling, whereby, when the engine is running in reverse, the exhaust gas being delivered to the turbine during reverse operation of the engine, whereby the turbine continues to run in its same direction but is opposed by the braking action of the coupling which is partly filled with oil, and valve controlled means for by-passing all, or a part of, the exhaust gas before it reaches the exhaust gas turbine.

WALTER KILCHENMANN.